United States Patent
Li et al.

(10) Patent No.: US 10,460,490 B2
(45) Date of Patent: Oct. 29, 2019

(54) METHOD, TERMINAL, AND COMPUTER STORAGE MEDIUM FOR PROCESSING PICTURES IN BATCHES ACCORDING TO PRESET RULES

(71) Applicant: TENCENT TECHNOLOGY (SHENZHEN) COMPANY LIMITED, Shenzhen, Guangdong (CN)

(72) Inventors: Kehui Li, Shenzhen (CN); Zhan Chen, Shenzhen (CN); Chang Liu, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 163 days.

(21) Appl. No.: 15/460,792

(22) Filed: Mar. 16, 2017

(65) Prior Publication Data
US 2017/0186207 A1    Jun. 29, 2017

Related U.S. Application Data

(63) Continuation of application No. PCT/CN2015/100363, filed on Dec. 31, 2015.

(30) Foreign Application Priority Data

Apr. 1, 2015    (CN) .......................... 2015 1 0152930

(51) Int. Cl.
*G06T 5/50*    (2006.01)
*G06F 16/95*    (2019.01)
(Continued)

(52) U.S. Cl.
CPC .......... *G06T 11/60* (2013.01); *G06F 3/04847* (2013.01); *G06F 16/95* (2019.01);
(Continued)

(58) Field of Classification Search
CPC .................................. G06F 17/00; G06T 11/60
See application file for complete search history.

(56) References Cited

U.S. PATENT DOCUMENTS

| | | | |
|---|---|---|---|
| 6,005,972 A * | 12/1999 | Fredlund | H04N 1/3871 |
| | | | 358/452 |
| 8,958,630 B1 * | 2/2015 | Gallup | G06K 9/6293 |
| | | | 382/159 |

(Continued)

FOREIGN PATENT DOCUMENTS

| | | |
|---|---|---|
| CN | 102201124 A | 9/2011 |
| CN | 102968805 A | 3/2013 |
| CN | 104050568 A | 9/2014 |

OTHER PUBLICATIONS

International Search Report in international application No. PCT/CN2015/100363, dated Apr. 1, 2016.
(Continued)

*Primary Examiner* — Li P Sun
*Assistant Examiner* — Qi Wan
(74) *Attorney, Agent, or Firm* — BakerHostetler

(57) ABSTRACT

Disclosed are an information processing method and terminal. The method includes: acquiring a first operation (101); in response to the first operation, selecting a plurality of pictures from a local information base or an information base pulled and obtained by a background server, and displaying the same on a user interface of a terminal (102); acquiring a second operation (103); in response to the second operation, partitioning to-be-added first target information into a plurality of items of second target information according to a preset rule, and overlaying the plurality of items of second target information on the plurality of pictures in one batch (104); and forming complete information corresponding to the first target information by the plurality of items of second target information, the second target (Continued)

information being partial information in the first target information (105).

13 Claims, 10 Drawing Sheets

(51) Int. Cl.
    *G06Q 10/10*          (2012.01)
    *G06T 11/60*          (2006.01)
    *G06F 3/0484*         (2013.01)
    *G06Q 50/00*          (2012.01)

(52) U.S. Cl.
    CPC .......... *G06Q 10/107* (2013.01); *G06Q 50/01* (2013.01); *G06T 5/50* (2013.01)

(56) References Cited

U.S. PATENT DOCUMENTS

| | | | | |
|---|---|---|---|---|
| 2006/0239515 | A1* | 10/2006 | Zhang | G06F 17/30265 382/118 |
| 2011/0099514 | A1* | 4/2011 | Singhal | G06F 3/0482 715/809 |
| 2013/0021368 | A1* | 1/2013 | Lee | H04N 1/00153 345/619 |
| 2015/0146220 | A1* | 5/2015 | Oki | G06K 15/1827 358/1.2 |
| 2015/0237268 | A1* | 8/2015 | Vaiaoga | H04N 5/265 348/218.1 |
| 2015/0281158 | A1* | 10/2015 | Grinspan | H04L 51/18 715/753 |
| 2016/0196350 | A1* | 7/2016 | Mau | G06F 17/30256 707/706 |
| 2016/0267357 | A1* | 9/2016 | Smith | G06K 9/228 |

OTHER PUBLICATIONS

Pitu V2.5.0.656 for Android http://www.xiazaizhijia.com/shouji/41855.html Mar. 11, 2014 (Mar. 11, 2014), figures 1-13.

* cited by examiner

METHOD, TERMINAL, AND COMPUTER STORAGE MEDIUM FOR PROCESSING PICTURES IN BATCHES ACCORDING TO PRESET RULES

CROSS REFERENCE TO RELATED APPLICATIONS

This is a continuation application of International Patent Application No. PCT/CN2015/100363, filed on Dec. 31, 2015, which claims priority to Chinese Patent Application No. 201510152930.3 filed on Apr. 1, 2015, the disclosures of which are incorporated by reference herein in their entirety.

TECHNICAL FIELD

The disclosure relates to communications technology and in particular to an information processing method and terminal, and a computer storage medium.

BACKGROUND

The inventors of the present application at least discover, in a process of implementing the technical solutions in the embodiments of the present application, the technical problems in the related art as follows.

As smart phones emerge, more and more applications provide various conveniences for users. In one scenario, a user can add various items of information into a single picture by means of an application having a picture processing function. However, this operation is only limited for a single picture. If the user wants to process a plurality of pictures, it is required to repeatedly operate the plurality of pictures one by one, so that multiple interactions are needed, resulting in complication and reduced picture processing efficiency. In the related art, an effective solution is not provided yet for this problem.

SUMMARY

In view of this, the embodiments of the disclosure are intended to provide an information processing method, a terminal, and a computer storage medium, which at least solve the problems in the conventional art and are capable of avoiding multiple interactions, simplifying user's operations and improving the picture processing efficiency.

The technical solutions in the embodiments of the disclosure are implemented as follows.

An embodiment of the disclosure provides an information processing method, which is applied to a terminal and includes:

acquiring a first operation;

in response to the first operation, selecting a plurality of pictures from a local information base or an information base pulled and obtained by a background server, and displaying the same on a user interface of the terminal;

acquiring a second operation;

in response to the second operation, partitioning to-be-added first target information into a plurality of items of second target information according to a preset rule, and overlaying the plurality of items of second target information on the plurality of pictures in one batch; and forming complete information corresponding to the first target information by the plurality of items of second target information, the second target information being partial information in the first target information.

An embodiment of the disclosure provides a terminal including:

a first acquisition unit, configured to acquire a first operation;

a first response unit, configured to select, in response to the first operation, a plurality of pictures from a local information base or an information base pulled and obtained by a background server, and display the same on a user interface of the terminal;

a second acquisition unit, configured to acquire a second operation; and a second response unit, configured to: partition, in response to the second operation, to-be-added first target information into a plurality of items of second target information according to a preset rule, and overlay the plurality of items of second target information on the plurality of pictures in one batch; and form complete information corresponding to the first target information by the plurality of items of second target information, the second target information being partial information in the first target information.

The first acquisition unit, the first response unit, the second acquisition unit and the second response unit may use a Central Processing Unit (CPU), a Digital Signal Processor (DSP) or a Field-Programmable Gate Array (FPGA) to execute respective processing.

An embodiment of the disclosure also provides a computer storage medium having computer executable instructions stored therein. The computer executable instructions may be configured to execute the above information processing method.

The information processing method provided by the embodiments of the disclosure is applied to a terminal and includes: acquiring a first operation; in response to the first operation, selecting a plurality of pictures from a local information base or an information base pulled and obtained by a background server, and displaying the same on a user interface of a terminal; acquiring a second operation; in response to the second operation, partitioning to-be-added first target information into a plurality of items of second target information according to a preset rule, and overlaying the plurality of items of second target information on the plurality of pictures in one batch; and forming complete information corresponding to the first target information by the plurality of items of second target information, the second target information being partial information in the first target information.

According to the embodiments of the disclosure, after a plurality of pictures are selected, to-be-added first target information is partitioned into a plurality of items of second target information according to a preset rule, the second target information being partial contents in the first target information. Then, the plurality of items of second target information, obtained by partitioning, are overlaid and displayed on the plurality of corresponding pictures in one batch according to the preset rule, such that multiple interactions can be avoided, user's operations are simplified, and the picture processing efficiency is improved.

DETAILED DESCRIPTION

Method Embodiment 1

Figure 1:
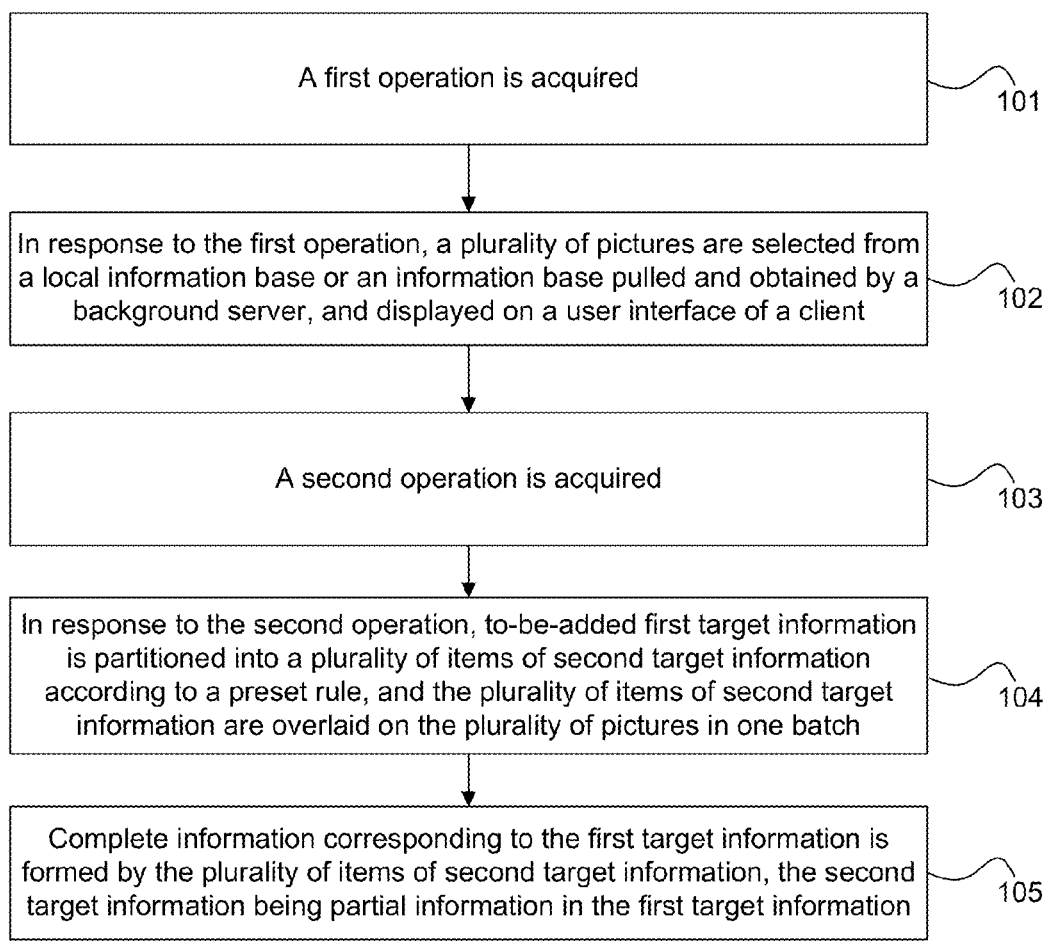
FIG. 1 is an implementation flowchart of a method embodiment 1 of the disclosure.

As shown in FIG. 1, an information processing method provided by an embodiment of the disclosure is applied to a terminal and includes the steps as follows.

Step 101: A first operation is acquired.

Step 102: In response to the first operation, a plurality of pictures are selected from a local information base or an information base pulled and obtained by a background server, and displayed on a user interface of the terminal.

Step 103: A second operation is acquired.

Step 104: In response to the second operation, to-be-added first target information is partitioned into a plurality of items of second target information according to a preset rule, and the plurality of items of second target information is overlaid on the plurality of pictures in one batch.

Step 105: Complete information corresponding to the first target information is formed by the plurality of items of second target information, the second target information being partial information in the first target information.

The embodiment of the disclosure adopts a one-to-many operation manner. Specifically, after a plurality of pictures are selected, to-be-added first target information is partitioned into a plurality of items of second target information according to a preset rule, the second target information being partial contents in the first target information. Then, the plurality of items of second target information, obtained by partitioning, is overlaid and displayed on the plurality of corresponding pictures in one batch according to the preset rule. For example, the first target information is text information "My Heart Flies about, Dream into Reality." If segmented text information obtained by partitioning according to the preset rule is "My", "Heart", "Flies", "about", "Dream", and "into Reality", a processing mechanism for a plurality of pictures can be realized by means of one-batch operation according to the embodiment of the disclosure, so that the above six segments of text information may be segmented and overlaid on six pictures capable of being correspondingly displayed according to the preset rule. Thus, a user does not need to execute the same operation on different pictures. That is, sequential inputting these six segments of text information "My", "Heart", "Flies", "about", "Dream", and "into Reality" on these six pictures can be avoided. Thus, multiple interactions are avoided, user operations are simplified, and the picture processing efficiency is improved. Moreover, after one-time input texts obtained according to the preset rule are segmented and overlaid on a plurality of pictures, the plurality of pictures are saved, and provided for a social application for use, such that the plurality of pictures are displayed in the same display interface of a preview/edit interface of the social application, thereby an integral splicing display result having unified styles, making the whole subject consistent and forming a series of style. Thus, eyes light up, key text information is clearly located and displayed, and key information in information can be captured by information sharing.

Certainly, another implementation solution of the embodiments of the disclosure may implement inputting and overlaying on a picture at one time without movement of a text box at different positions of this picture to respectively input different items of text information. The word size of the text information is reduced according to the preset rule, two segments of information "My Heart Flies about" and "Dream into Reality" are obtained by splitting text information "My Heart Flies about, Dream into Reality", are processed in one batch, are overlaid and displayed on a selected picture. These two segments of information may be distributed up and down, and may be distributed left and right.

Different from the above processing for text information, text segments obtained by splitting a text are overlaid on a plurality of selected pictures according to the preset rule, and the plurality of pictures are provided for a social application for use finally, such that the plurality of pictures are displayed in the same display interface of a preview/edit interface of the social application, thereby an integral splicing display result having unified styles, making the whole subject consistent or forming the same series of effects. Alternatively, different from processing for text information in which the text information is split and then segmented and overlaid on a picture, another implementation solution of the embodiments of the disclosure may also be to overlay a plurality of pictures. Overlaying of two pictures is taken as an example. A complete first picture is overlaid with a second picture, the second picture may be in a form of picture shielding or picture skin such as a form of an integrated butterfly, gift box, signature or watermark, and the first picture and the second picture are overlaid, and provided for a social application for use, such that the first picture and the second picture are displayed in the same display interface of a preview/edit interface of the social application, and an integral splicing display result having unified styles, making the whole subject consistent or forming the same series of effects may be obtained. A specific application scenario diagram is shown as subsequent application scenario descriptions, which will not be elaborated herein.

In conclusion, in addition to the effects of avoiding multiple interactions, simplifying user operations and improving the picture processing efficiency in terms of the above-mentioned technology, in terms of interface presentation and user's use, texts are split according to the preset rule, and text segments are overlaid on a plurality of pictures or a single picture or partially overlaid between the plurality of pictures by means of the present application, so as to obtain a picture processing result of freely and conveniently achieving a unified effect. As such, the picture processing result is shared to Moments in Wechat or Weibo, an integrated effect will be seen on preview interfaces of these social platforms, and texts are clear and highlighted. The user may better interpret a picture and self-express, texts can be more highlighted, and information may be expressed without clicking to enlarge.

In an implementation manner of the embodiments of the disclosure, the to-be-added first target information includes any one or a combination of the following manners:

manner 1: first information selected from a local information base or an information base pulled and obtained by a background server, the first information referring to information other than text information input by a user, such as a taken picture or information about a current geographical location of the user, weather information, temperature information, humidity information, user signatures or template watermark or signature information; and manner 2: second information input by the user in real time, the second information referring to text information input by the user.

In an implementation manner of the embodiments of the disclosure, an acquisition manner of the preset rule includes any one of:

manner 1: a locally extracted preset rule;

manner 2: a preset rule locally generated as required; and manner 3: a preset rule pulled and obtained from the background server in requesting.

Herein, the preset rule is configured to represent the arrangement rule and/or attribute of the plurality of pictures and the plurality of items of second target information overlaid on the plurality of pictures.

Method Embodiment 2

Figure 2:
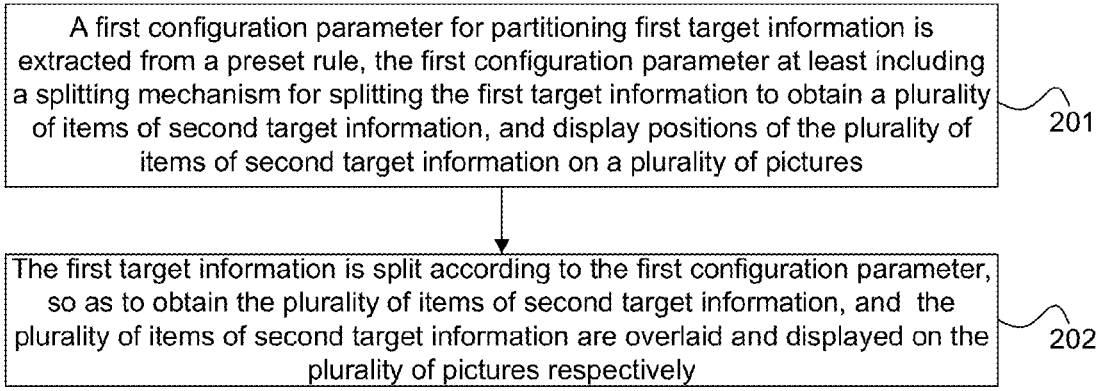
FIG. 2 is an implementation flowchart of a method embodiment 2 of the disclosure.

On the basis of the method embodiment 1 and various implementation manners, as shown in FIG. 2, the step of partitioning the to-be-added first target information into the plurality of items of second target information according to the preset rule and overlaying the plurality of items of second target information on the plurality of pictures in one batch includes the steps as follows.

Step 201: A first configuration parameter for partitioning the first target information is extracted from the preset rule, the first configuration parameter at least including a splitting mechanism for splitting the first target information to obtain the plurality of items of second target information, and display positions of the plurality of items of second target information on the plurality of pictures.

Here, the splitting mechanism includes multiple contents which may be a placeholder for segmented texts, namely a length of specifically occupied characters during displaying on the plurality of corresponding pictures.

Step 202: The first target information is split according to the first configuration parameter, so as to obtain the plurality of items of second target information, and overlay and display the same on the plurality of corresponding pictures respectively.

Method Embodiment 3

Figure 3:
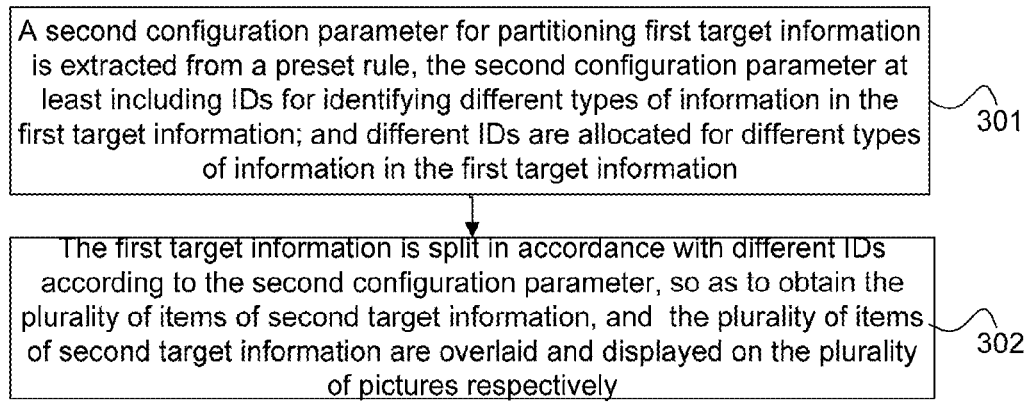
FIG. 3 is an implementation flowchart of a method embodiment 3 of the disclosure.

On the basis of the method embodiment 1 and various implementation manners, as shown in FIG. 3, the step of partitioning the to-be-added first target information into the plurality of items of second target information according to the preset rule and overlaying the plurality of items of second target information on the plurality of pictures in one batch further includes the steps as follows.

Step 301: A second configuration parameter for partitioning the first target information is extracted from the preset rule, the second configuration parameter at least including identifiers (ID) for identifying different types of information in the first target information. Different IDs are allocated for different types of information in the first target information.

Step 302: The first target information is split in accordance with different IDs according to the second configuration parameter, so as to obtain the plurality of items of second target information, and overlay and display the same on the plurality of corresponding pictures respectively.

Method Embodiment 4

Figure 4:
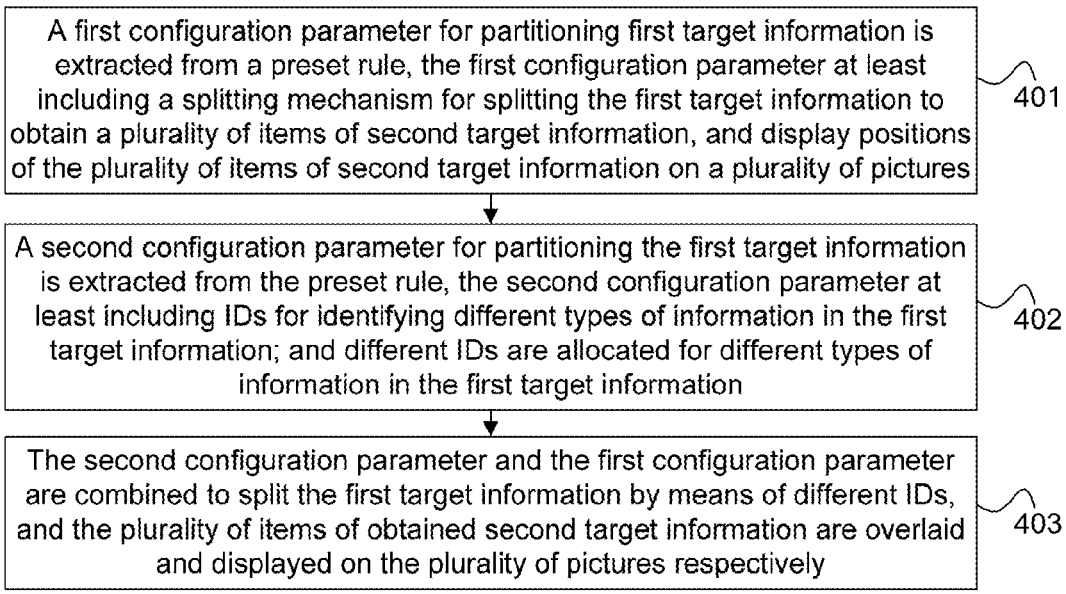
FIG. 4 is an implementation flowchart of a method embodiment 4 of the disclosure.

On the basis of the method embodiment 1 and various implementation manners, as shown in FIG. 4, the step of partitioning the to-be-added first target information into the plurality of items of second target information according to the preset rule and overlaying the plurality of items of second target information on the plurality of pictures in one batch further includes the steps as follows.

Step 401: A first configuration parameter for partitioning the first target information is extracted from the preset rule, the first configuration parameter at least including a splitting mechanism for splitting the first target information to obtain the plurality of items of second target information, and display positions of the plurality of items of second target information on the plurality of pictures.

Step 402: A second configuration parameter for partitioning the first target information is extracted from the preset rule, the second configuration parameter at least including IDs for identifying different types of information in the first target information. Different IDs are allocated for different types of information in the first target information.

Step 403: The second configuration parameter and the first configuration parameter are combined to split the first target information by means of different IDs, and the plurality of items of obtained second target information is overlaid and displayed on the plurality of corresponding pictures respectively.

Method Embodiment 5

Figure 5:
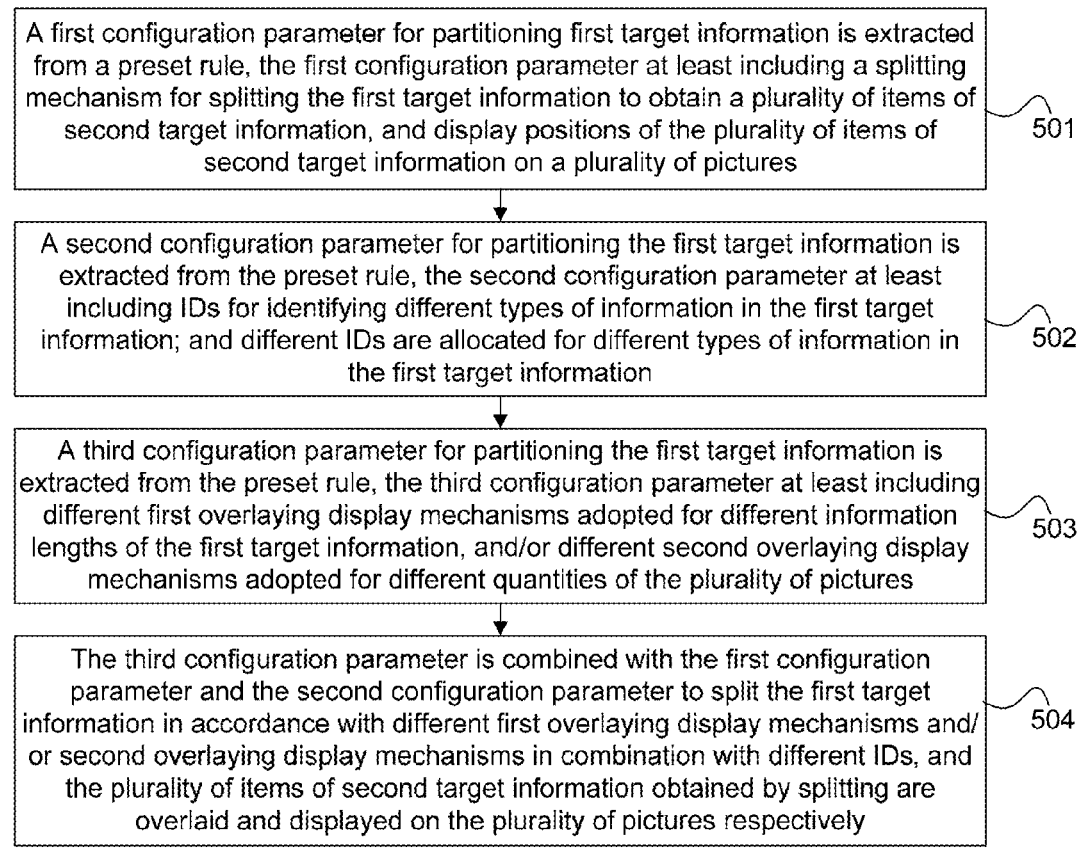
FIG. 5 is an implementation flowchart of a method embodiment 5 of the disclosure.

On the basis of the method embodiment 1 and various implementation manners, as shown in FIG. 5, the step of partitioning the to-be-added first target information into the plurality of items of second target information according to the preset rule and overlaying the plurality of items of second target information on the plurality of pictures in one batch further includes the steps as follows.

Step 501: A first configuration parameter for partitioning the first target information is extracted from the preset rule, the first configuration parameter at least including a splitting mechanism for splitting the first target information to obtain the plurality of items of second target information, and display positions of the plurality of items of second target information on the plurality of pictures.

Step 502: A second configuration parameter for partitioning the first target information is extracted from the preset rule, the second configuration parameter at least including IDs for identifying different types of information in the first target information. Different IDs are allocated for different types of information in the first target information.

Step 503: A third configuration parameter for partitioning the first target information is extracted from the preset rule, the third configuration parameter at least including different first overlaying display mechanisms adopted for different information lengths of the first target information, and/or different second overlaying display mechanisms adopted for different quantities of the plurality of pictures.

Step 504: The third configuration parameter is combined with the first configuration parameter and the second configuration parameter to split the first target information in accordance with different first overlaying display mechanisms and/or second overlaying display mechanisms by means of different IDs, and the plurality of items of second target information obtained by splitting are overlaid and displayed on the plurality of corresponding pictures respectively.

In an implementation manner of the embodiments of the disclosure, after the plurality of items of second target information is overlaid on the plurality of pictures in one batch, the plurality of pictures are saved, and the plurality of pictures are provided for a social application for use, such that the plurality of pictures are displayed in the same display interface of a preview/edit interface of the social application, and an integral splicing display result having unified styles, making the whole subject consistent or forming the same series of effects is obtained.

Terminal Embodiment 1

Figure 6:
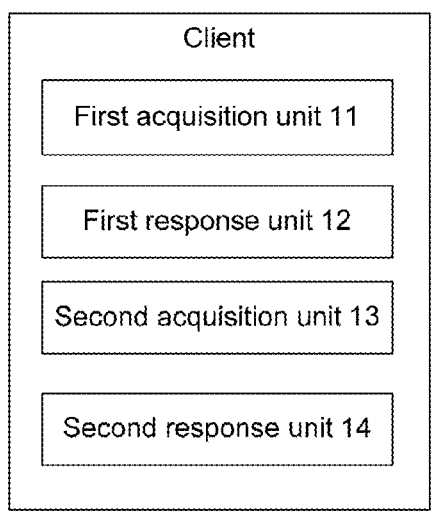
FIG. 6 is a structure diagram of a terminal embodiment 1 of the disclosure.

As shown in FIG. 6, a terminal provided by the embodiment of the disclosure includes:

a first acquisition unit 11, configured to acquire a first operation;

a first response unit 12, configured to select, in response to the first operation, a plurality of pictures from a local information base or an information base pulled and obtained by a background server, and display same on a user interface of the terminal;

a second acquisition unit 13, configured to acquire a second operation; and a second response unit 14, configured to: partition, in response to the second operation, to-be-added first target information into a plurality of items of second target information according to a preset rule, and overlay the plurality of items of second target information on the plurality of pictures in one batch; and form complete information corresponding to the first target information by the plurality of items of second target information, the second target information being partial information in the first target information.

In an implementation manner of the embodiments of the disclosure, the to-be-added first target information includes any one or a combination of the following manners:

manner 1: first information selected from the local information base or the information base pulled and obtained by the background server; and manner 2: second information input by a user in real time.

In an implementation manner of the embodiments of the disclosure, an acquisition manner of the preset rule includes any one of:

manner 1: a locally extracted preset rule;

manner 2: a preset rule locally generated as required; and manner 3: a preset rule pulled and obtained from the background server in requesting.

Herein, the preset rule is configured to represent the arrangement rule and/or attribute of the plurality of pictures and the plurality of items of second target information overlaid on the plurality of pictures.

In an implementation manner of the embodiments of the disclosure, the second response unit further includes:

a first configuration parameter extraction subunit, configured to extract a first configuration parameter for partitioning the first target information from the preset rule, the first configuration parameter at least including a splitting mechanism for splitting the first target information to obtain the plurality of items of second target information, and display positions of the plurality of items of second target information on the plurality of pictures; and a processing subunit, configured to split the first target information according to the first configuration parameter, so as to obtain the plurality of items of second target information, and overlay and display the same on the plurality of corresponding pictures respectively.

In an implementation manner of the embodiments of the disclosure, the second response unit further includes:

a second configuration parameter extraction subunit, configured to extract a second configuration parameter for partitioning the first target information from the preset rule, and allocate different IDs for different types of information in the first target information, the second configuration parameter at least including IDs for identifying different types of information in the first target information.

The processing subunit is further configured to: split the first target information in accordance with different IDs according to the second configuration parameter, so as to obtain the plurality of items of second target information, and overlay and display the same on the plurality of corresponding pictures respectively; or, combine the second configuration parameter and the first configuration parameter to split the first target information by means of different IDs, and overlay and display the plurality of items of obtained second target information on the plurality of corresponding pictures respectively.

In an implementation manner of the embodiments of the disclosure, the second response unit further includes:

a third configuration parameter extraction subunit, configured to extract a third configuration parameter for partitioning the first target information from the preset rule, the third configuration parameter at least including different first overlaying display mechanisms adopted for different information lengths of the first target information, and/or different second overlaying display mechanisms adopted for different quantities of the plurality of pictures.

The processing subunit is further configured to combine the third configuration parameter with the first configuration parameter and the second configuration parameter to split the first target information in accordance with different first overlaying display mechanisms and/or second overlaying display mechanisms by means of different IDs, and overlap and display the plurality of items of second target information obtained by splitting on the plurality of corresponding pictures respectively.

In an implementation manner of the embodiments of the disclosure, the terminal further includes:

a splicing display unit, configured to save, after the plurality of items of second target information is overlaid on the plurality of pictures in one batch, the plurality of pictures, and provide the plurality of pictures for a social application for use, such that the plurality of pictures are displayed in the same display interface of a preview/edit interface of the social application, and an integral splicing display result having unified styles, making the whole subject consistent or forming the same series of effects is obtained.

Here, it is noted that the terminal may be an electronic device such as a Personal Computer (PC), or may be a portable electronic device such as a PAD, a tablet PC and a laptop, or may be a smart mobile terminal such as a mobile phone, which is not limited to descriptions here. The server may be an electronic device constituted by means of a cluster system, integrated to achieve each unit function or split to achieve each unit function. The terminal and the server each at least include a data base for data storage and a processor for data processing, or include a storage medium disposed in the server or a storage medium disposed independently.

Herein, when the processor for data processing executes processing, a microprocessor, a CPU, a DSP or an FPGA may be adopted for implementation. The storage medium contains an operating instruction, the operating instruction may be a computer executable code, and all steps in the flow of the information processing method in the embodiment of the disclosure are implemented by means of the operating instruction.

Figure 7:
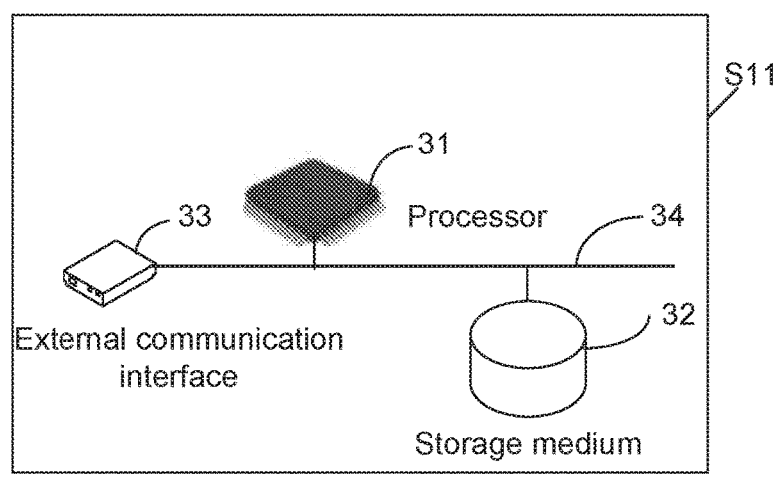
FIG. 7 is a hardware structure diagram of a terminal according to an embodiment of the disclosure.

As shown in FIG. 7, an example of a hardware entity S11 serving as the terminal and the server is shown. The apparatus includes a processor 31, a storage medium 32 and at least one external communication interface 33. The processor 31, the storage medium 32 and the external communication interface 33 are connected by means of a bus 34.

Here, it is noted that the above descriptions involving a terminal and a server are similar to the above method descriptions and have identical beneficial effect descriptions with those of the methods, which will not be elaborated. Undisclosed technical details in the terminal and server embodiments of the disclosure refer to the descriptions of the method embodiments of the disclosure.

The embodiments of the disclosure are illustrated with reference to a reality application scenario as follows.

Application scenario 1: text information is split into a plurality of segments of information, overlaid and displayed on a plurality of corresponding pictures by means of batch operation respectively.

The application scenario adopts the embodiments of the disclosure, and is actually a solution for overlaying a plurality of characters in a text box into a plurality of pictures respectively. Abbreviations and key terms involved in the following descriptions will be elaborated herein. (1) Text box: texts overlaid on pictures, which may be texts input by a user, weather and geographical location information obtained in real-time, and information in a picture EXIF, wherein the EXIF is an image file format, data storage thereof being identical to those of a JPEG format. The EXIF format is a format of inserting information about a digital photo into the header of the JPEG format, including various photographing conditions such as an aperture, a shutter, white balance, ISO, a focal distance and date time during photographing, camera brands, mannerls, color codes, recorded sounds during photographing, a Global Positioning System (GPS), and thumbnails. In short, EXIF=JPEG+ photographing parameter. Pictures in the EXIF format may be viewed by means of any picture viewing software capable of checking JPEG files. Picture processing software in this scenario may process EXIF information. For example, the picture processing software is Daily Photoshop. (2) Interesting multi-picture: a software function of selecting a plurality of pictures, editing same in an interface at the same time, overlaying specific texts (customizably edited) on each picture or the whole combination of pictures, and then saving and sharing respectively. (3) Multi-picture template: a file for defining arrangement rules and attributes of pictures and texts overlaid thereon.

As for this application scenario, some pieces of picture processing software adopted in the conventional art may only add text information to a single picture. Specifically, a user inputs words to-be-presented in a text box, and overlays, after confirmation, the words to a specified position corresponding to the text box where pictures are selected. Since the conventional art limits words input by the user at a single time or information pulled from the picture EXIF/background is only added to a single picture, in the presence of a plurality of pictures, the user has to operate the pictures for many times one by one regardless of addition of a segment of complete text to different pictures or addition of the same text (e.g., information such as signatures, time, place and weather) to all pictures. Thus, multiple interactions are needed, the operation is complicated and complex, and the picture processing efficiency is low. Obviously, the functional freedom, the operation convenience and the image generation effect are all undesirable. However, the embodiments of the disclosure may support the batch import operation for the user, and may add information text segments input by the user at one time or pulled from the picture EXIF/background to a plurality of pictures according to a preset rule respectively, thereby freely and conveniently achieving a unified display effect.

The embodiments of the disclosure may overlay a segment of text edited and input by the user at a single time or read picture EXIF information or information pulled from the background to a plurality of pictures by introducing the multi-picture template to specify key text information namely the above-mentioned preset rule. For example, text information expressing moods, pulled picture EXIF information, or user information including currently pulled time, place and weather may be added to pictures. These information segments are overlaid on a plurality of pictures according to a specified preset rule for a pre-designed multi-picture template, thereby achieving a new picture text overlaid display effect, and assisting the user in better processing picture texts and editing a plurality of pictures at a single time. The embodiments of the disclosure are particularly applied to a social platform, supporting post of a plurality of pictures, such as Moments in Wechat. Moreover, by overlaying texts to pictures by means of the specified preset rule for the multi-picture template, an integral and unified design effect is obtained, such that the user better interprets pictures and self-expresses, texts can be more highlighted, and information may be expressed without clicking to enlarge.

Figure 8:
FIG. 8, FIG. 10 and FIGS. 11a-11c are schematic diagrams of an application scenario 1 according to an embodiment of the disclosure.

FIG. 8 shows a display diagram of this application scenario obtained by adopting the embodiments of the disclosure. A user selects nine pictures. The nine pictures are arranged in an editing interface on a social platform such as Moments in Wechat or Weibo in an arrangement manner of nine pictures. In this interface, texts edited and input by the user, or a read picture EXIF, or information pulled and obtained from the background will be allocated to different pictures respectively. If clicking to save, the nine pictures overlaid with texts will be independently saved as nine pictures. In this case, if the nine pictures are shared to Moments or Weibo, an integral effect will be seen in preview interfaces of these platforms, texts being highlighted. A single picture may be clicked to enlarge, the operation being similar to sharing of nine pictures.

Specifically, this application scenario mainly includes the following contents according to the embodiments of the disclosure.

Figure 9:
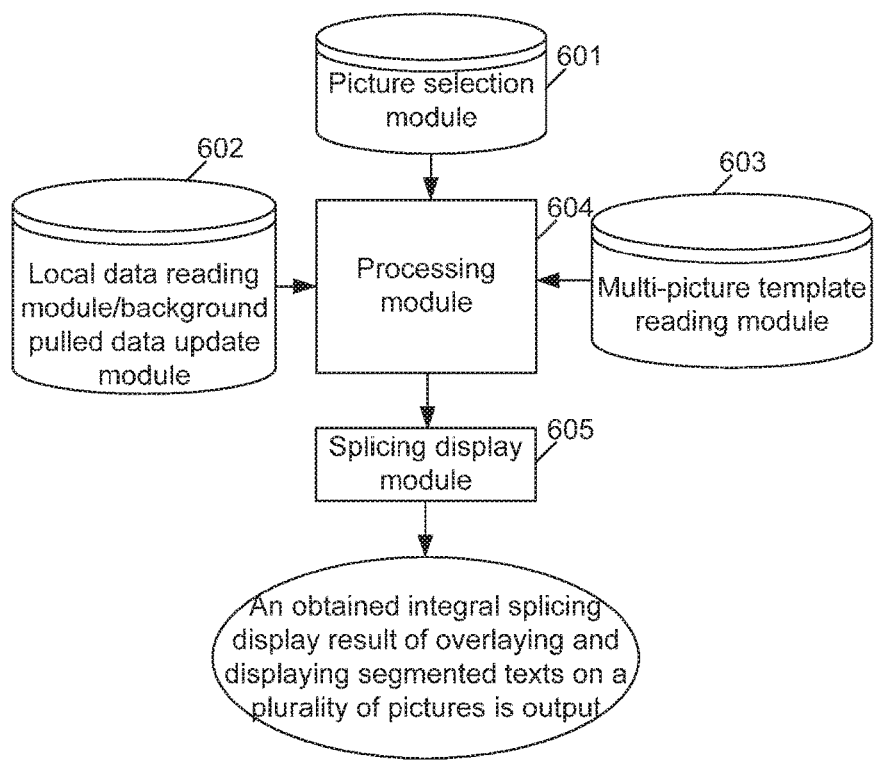
FIG. 9 is a structure diagram of a terminal adopting an application scenario 1 according to an embodiment of the disclosure.

FIG. 9 is a structure diagram of a terminal in this application scenario according to an embodiment of the disclosure. The terminal includes a picture selection module 601, a local data reading module/background pulled data update module 602, a multi-picture template reading module 603, a processing module 604, and a splicing display module 605. The picture selection module 601 is configured in such a way that a user selects a plurality of pictures to be performed with text processing via this module. All of the selected pictures are arranged in an editing page together to be edited, and are arranged in accordance with an arrangement rule for corresponding pictures in common social platforms. The local data reading module/background pulled data update module 602 is configured in such a way that the user may read EXIF information in a picture or updated background pulled data via this module. The multi-picture template reading module 603 is configured in such a way that the user may read a desirable multi-picture template via this module and parse a text processing rule in the multi-picture template. The processing module 604 is configured to split complete text information into a plurality of segments of text information and overlay and display the segmented text information on a plurality of pictures in one batch. The splicing display module 605 is configured to acquire the plurality of pictures and provide same for a social application for use, such that the plurality of pictures are displayed in the same display interface of a preview/edit interface of the social application, and an obtained result of overlaying and displaying segmented texts on a plurality of pictures and an integral splicing display result having unified styles, making the whole subject consistent or forming the same series of effects are finally output.

Figure 10:
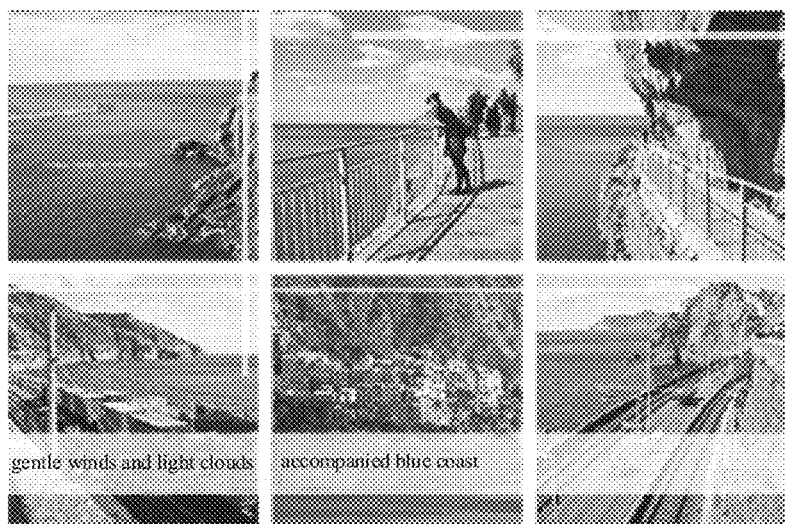

Specifically, as for the multi-picture template, different multi-picture templates are built in a terminal or downloaded on line. The text processing rule in the template is configured to distribute specified words. The template, illustrated in FIG. 8, FIG. 10, and FIGS. 11a-11c, may include the following information:

1: groupld of a group of texts, namely a unique ID of a piece of text data, configured to distinguish during editing, saving and displaying, wherein "MALAYSIA" in FIG. 8 belongs to the same geographical location information text pulled by the background, and is allocated with a groupld, and "2014" belongs to time information texts read from a picture EXIF, and is allocated with another groupld; and "gentle winds and light clouds accompanied blue coast" in FIG. 10 belongs to the same text that can be edited by a user, and is allocated with a groupld.

2: placeholder at a place where texts needed to be displayed on a picture, wherein each text display placeholder may include: a corresponding groupld, a capture position in this text segment, a default value, a data source (update manner), a font, a size, a color alignment manner, and the like; in FIG. 10, "gentle winds and light clouds" corresponds to a text placeholder, which will be overlaid and displayed on the fourth picture and specifies that the capture positions of the text segment are 0-3; and "accompanied blue coast" belongs to another text placeholder, which will be overlaid and displayed on the fifth picture and specifies that the capture positions of the text segment are 4-8. A final overlaying display effect is shown in FIG. 10.

Figure 11A:
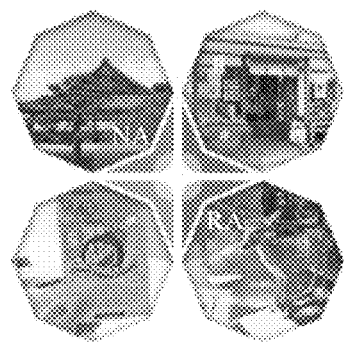
Figure 11B:
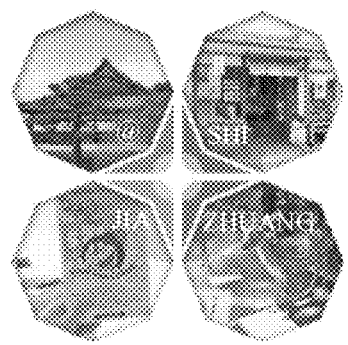
Figure 11C:
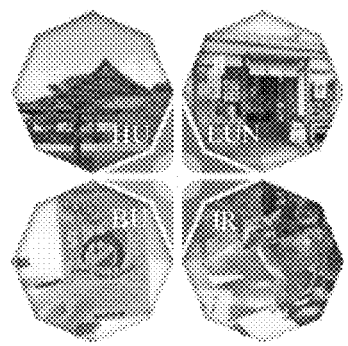

3: text processing rule. When text segments have different values, arrangement manners are often different. As shown in FIGS. 11a-11c, three pictures corresponding to FIGS. 11a-11c represent text overlaying rules when text segments have different lengths. FIGS. 11a-11c represent final overlaying display results obtained by correspondence of different text values to different text arrangement rules. (1) As shown in FIG. 11a, when a text segment has two words, the text segment is segmented to overlay and display on the first picture and the fourth picture, "*" being overlaid and displayed on the second picture and the third picture respectively. (2) As shown in FIG. 11b, when a text segment has three words, the text segment is segmented to overlay and display on the second picture, the third picture and the fourth picture, "@" being overlaid and displayed on the first picture. (3) As shown in FIG. 11c, when a text segment has four words, the text segment is segmented to overlay and display on the first picture, the second picture, the third picture and the fourth picture.

Specifically, the processing module 604 and the splicing display module 605 may be respectively implemented by means of different modules as recited in this embodiment, or may be integrated in the same module. For example, the processing module 604 and the splicing display module 605 are integrated together and called as a text processing module. The text processing module is configured to overlay, after texts to be overlaid are determined, texts on selected pictures in a segmentation manner according to the text processing rule, and finally complete picture splicing display operations, such that the plurality of pictures are displayed in the same display interface of a preview/edit interface of the social application, and an integral splicing display result having unified styles, making the whole subject consistent or forming the same series of effects is obtained.

Figure 12:
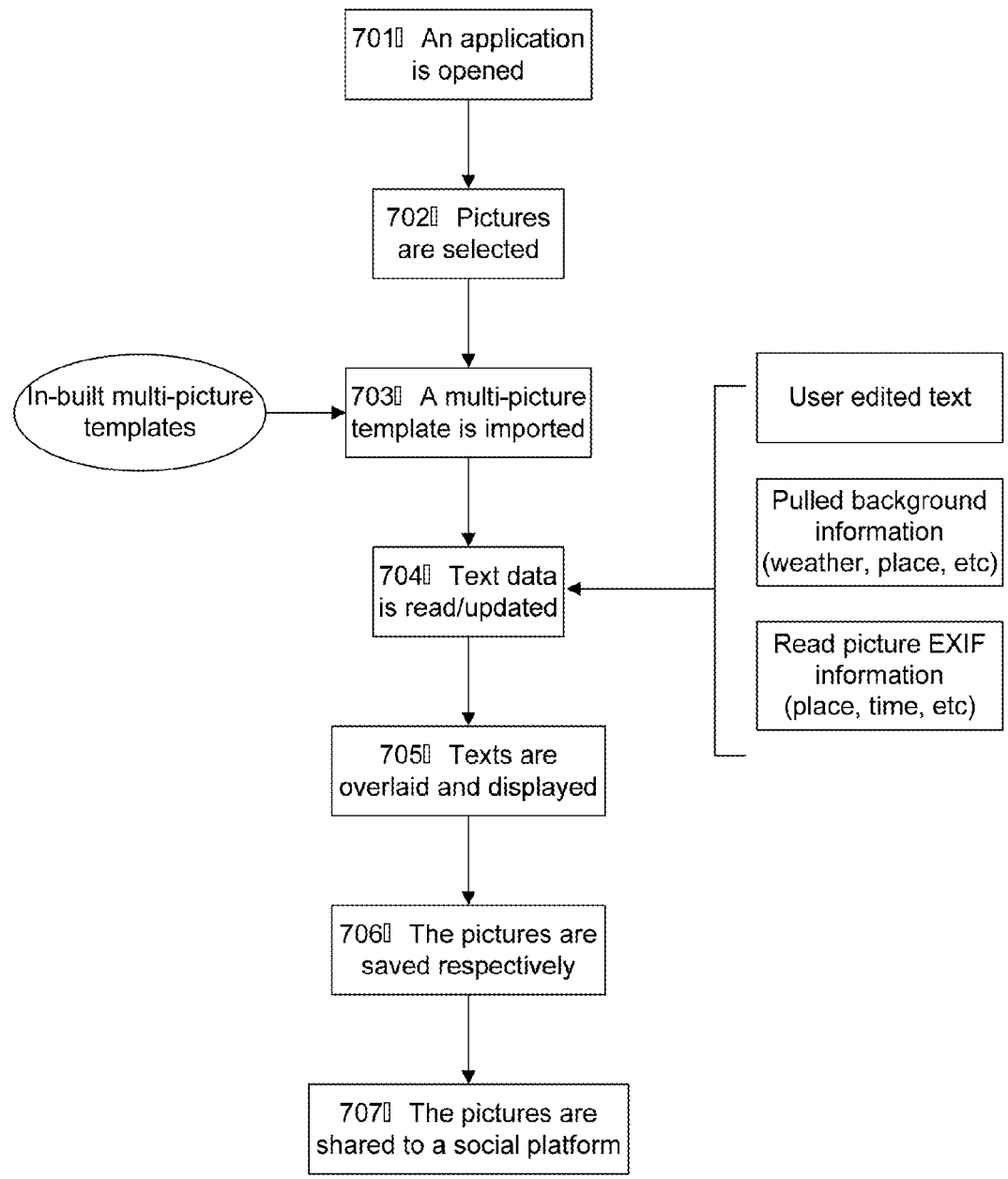
FIG. 12 is an execution flow diagram of a text processing module of an application scenario 1 according to an embodiment of the disclosure.

FIG. 12 shows an execution flow of implementation by the text processing module, including the steps as follows.

Step 701-702: After opening a picture processing application, a user selects one or more pictures on which texts are to be overlaid from a picture selection page of a user interface of terminal.

Here, in order to achieve a better social platform sharing effect, a plurality of pictures are used, for example. Four pictures, six pictures or nine pictures are preferred, but theoretically, a random number of pictures are supported.

Step 703: The user selects a multi-picture template, and the multi-picture template is read into a memory, the multi-picture template defining text attributes and a segmentation rule.

Step 704: Text data is read/updated in various manners.

Here, various manners include: multiple update mechanisms for editing texts by a user, pulling background information, reading picture EXIF information and the like. The templates will specify default read/update manners, but all templates support free edition by a user.

Step 705: Text data that has been acquired is overlaid on specified pictures according to the text attributes (font, size, shadow, stroke and position) and the segmented arrangement rule defined in the template.

Steps 706-707: The pictures on which the texts are overlaid are independently saved, one-key sharing to a social platform is supported after saving, and text overlaying effects and arrangement sequences of the pictures are similar to those in an editing interface to achieve the effect of What You See Is What You Get.

A rule is preset in a multi-picture template, texts and pictures are processed in batches according to the preset rule, a text processing function of editing a plurality of pictures by a single operation is achieved, and a unified, highlighted and integral design effect can be formed.

Figure 13:
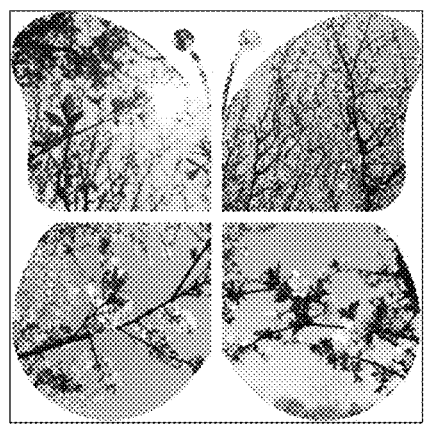
FIGS. 13-14 are schematic diagrams of an application scenario 2 according to an embodiment of the disclosure.
Figure 14:
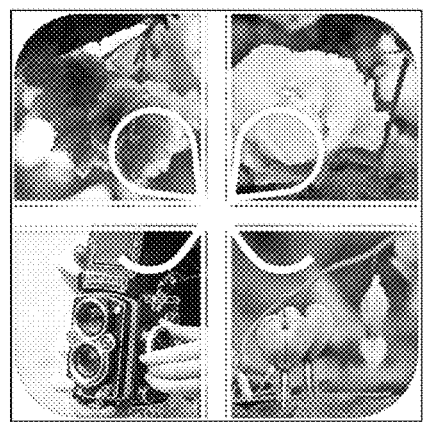

Here, it is noted that the display effects of the application scenario 1 can be obtained by adopting an application scenario 2 different from the application scenario 1. The display effects of the application scenario 2 are shown in FIG. 13 and FIG. 14. The effect of overlaying texts on a plurality of pictures respectively in the application scenario 1 can be achieved, an integral effect can also be formed by overlaying a complete picture on pictures, and after picture masks are overlaid on four pictures, an integral butterfly effect, an integral gift box effect and the like will be achieved by sharing the pictures to Moments in Wechat. The application scenario 2 is also implemented according to a preset rule by means of update of a multi-picture template including the preset rule instead of modification of codes, so the functions of processing a plurality of pictures in batches and adding the same text (signatures, watermarks, etc) can be achieved, and pictures may be quickly and perfectly prevented from being stolen. The embodiments of the disclosure are also applicable to an application scenario 9Cut where a picture is cut and shared to a social platform so as to obtain a combination effect. Application of the disclosure to a picture processed by 9Cut can obtain a more complete integral effect.

If the integrated modules in the embodiments of the disclosure are implemented in a form of a software function module and is sold or used as an independent product, the product may be stored in a computer readable storage medium. Based on this understanding, those skilled in the art shall understand that the embodiments of the application may be provided as a method, a system or a computer program product. Thus, forms of full hardware, full software or a combination thereof may be adopted in the application. Moreover, a form of the computer program product implemented on one or more computer available storage media containing computer available program codes may be adopted in the application. The storage media include, but are not limited to, a U disk, a mobile hard disk, a Read-Only Memory (ROM), a disk memory, a Compact Disc (CD)-ROM, an optical memory and the like.

The application is described with reference to flow charts and/or block diagrams of the method, the device (system) and the computer program product according to the embodiments of the disclosure. It will be appreciated that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific manner, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flow charts and/or one or more blocks of the block diagrams.

Although the preferred embodiments of the application have been described, once those skilled in the art obtains a basic creativity concept, those skilled in the art may change and modify these embodiments additionally. Thus, the appended claims are intended to be interpreted as all changes and modifications including the preferred embodiments and falling within the scope of the application.

Correspondingly, an embodiment of the disclosure also provides a computer storage medium having computer executable instructions stored therein. The computer executable instructions are configured to execute the information processing method according to the embodiment of the disclosure.

INDUSTRIAL APPLICABILITY

By means of the embodiments of the disclosure, after a plurality of pictures are selected, to-be-added first target information is partitioned into a plurality of items of second target information according to a preset rule, the second target information being partial contents in the first target information. Then, the plurality of items of second target information, obtained by partitioning, are overlaid and displayed on the plurality of corresponding pictures in one batch according to the preset rule, such that multiple interactions can be avoided, user operations are simplified, and the picture processing efficiency is improved.

The invention claimed is:
1. An information processing method, applied to a terminal, the method comprising:
　receiving a first operation;
　in response to the first operation, selecting a plurality of pictures from a local information base or an information base pulled and obtained by a background server, and displaying the selected plurality of pictures on a user interface of the terminal;
　receiving to-be-added first target information comprises:
　receiving first information which is non-text information selected from the local information base or the information base obtained by pulled and obtained by the background server; or, receiving a combination of the first information and second information, wherein the second information is text input by a user in real time,
　receiving a second operation;
　in response to the second operation, partitioning the to-be-added first target information into a plurality of items of second target information, and overlaying the plurality of items of second target information on the plurality of pictures simultaneously according to a preset rule, wherein the preset rule being configured to represent an arrangement rule and/or attribute of the plurality of pictures and the plurality of items of second target information overlaid on the plurality of pictures; and
　displaying the plurality of pictures, with the plurality of items of second target information being displayed as multiple partial information split on the plurality of pictures.

2. The method according to claim 1, wherein the preset rule comprises any one of:
　a locally extracted preset rule;
　a preset rule locally generated as required; and
　a preset rule pulled and obtained from the background server in a manner of requesting a server,
　the preset rule being configured to represent an arrangement rule and/or attribute of the plurality of pictures and the plurality of items of second target information overlaid on the plurality of pictures.

3. The method according to claim 1, wherein the step of partitioning the to-be-added first target information into the plurality of items of second target information according to the preset rule and overlaying the plurality of items of second target information on the plurality of pictures in one batch comprises:

extracting a first configuration parameter for partitioning the first target information from the preset rule, the first configuration parameter at least comprising a splitting mechanism for splitting the first target information to obtain the plurality of items of second target information, and display positions of the plurality of items of second target information on the plurality of pictures; and splitting the first target information according to the first configuration parameter so as to obtain the plurality of items of second target information and overlaying and displaying the plurality of items of second target information on the plurality of pictures, respectively.

4. The method according to claim 3, wherein the step of partitioning the to-be-added first target information into the plurality of items of second target information according to the preset rule and overlaying the plurality of items of second target information on the plurality of pictures in one batch comprises:

extracting a second configuration parameter for partitioning the first target information from the preset rule, the second configuration parameter at least comprising identifiers (ID) for identifying different types of information in the first target information, and allocating different IDs for different types of information in the first target information, wherein the different types of information in the first target information at least comprises information obtained in different manners; and splitting the first target information in accordance with different IDs according to the second configuration parameter, so as to obtain the plurality of items of second target information, and overlaying and displaying the plurality of items of second target information on the plurality of pictures respectively;

or, combining the second configuration parameter and the first configuration parameter to split the first target information by means of different IDs, and overlaying and displaying the plurality of items of obtained second target information on the plurality of pictures respectively.

5. The method according to claim 4, wherein the step of partitioning the to-be-added first target information into the plurality of items of second target information according to the preset rule and overlaying the plurality of items of second target information on the plurality of pictures in one batch comprises:

extracting a third configuration parameter for partitioning the first target information from the preset rule, the third configuration parameter at least comprising different first overlaying display mechanisms adopted for different information lengths of the first target information, and/or different second overlaying display mechanisms adopted for different quantities of the plurality of pictures; and combining the third configuration parameter with the first configuration parameter and the second configuration parameter to split the first target information in accordance with different first overlaying display mechanisms and/or second overlaying display mechanisms, and overlaying and displaying the plurality of items of second target information obtained by splitting on the plurality of pictures respectively.

6. The method according to claim 1, further comprising:
after the plurality of items of second target information are overlaid on the plurality of pictures in one batch, saving the plurality of pictures, and providing the plurality of pictures for a social application for use, such that the plurality of pictures are displayed in the same display interface of a preview/edit interface of the social application.

7. A terminal, comprising:

a processor, configured to: receive a first operation; and select, in response to the first operation, a plurality of pictures from a local information base or an information base pulled and obtained by a background server, and display the selected plurality of pictures on a user interface of the terminal;

receiving to-be-added first target information comprises:

receiving first information which is non-text information selected from the local information base or the information base obtained by pulled and obtained by the background server; or, receiving a combination of the first information and second information, wherein the second information is text input by a user in real time, the processor, further configured to: receive a second operation; and partition, in response to the second operation, the to-be-added first target information into a plurality of items of second target information, and overlay the plurality of items of second target information on the plurality of pictures simultaneously according to a preset rule, wherein the preset rule being configured to represent an arrangement rule and/or attribute of the plurality of pictures and the plurality of items of second target information overlaid on the plurality of pictures display the plurality of pictures, with the plurality of items of second target information being displayed as multiple partial information split on the plurality of pictures; and a storage medium, configured to store a computer-executable instruction capable of running on the processor.

8. The terminal according to claim 7, wherein the preset rule comprises any one of:

a locally extracted preset rule;

a preset rule locally generated as required; and a preset rule pulled and obtained from the background server in a manner of requesting a server, the preset rule being configured to represent an arrangement rule and/or attribute of the plurality of pictures and the plurality of items of second target information overlaid on the plurality of pictures.

9. The terminal according to claim 7, wherein the processor is further configured:

to extract a first configuration parameter for partitioning the first target information from the preset rule, the first configuration parameter at least comprising a splitting mechanism for splitting the first target information to obtain the plurality of items of second target information, and display positions of the plurality of items of second target information on the plurality of pictures; and to split the first target information according to the first configuration parameter, so as to obtain the plurality of items of second target information and overlaying and displaying the plurality of items of second target information on the plurality of pictures respectively.

10. The terminal according to claim 9, wherein the processor is further configured:

to extract a second configuration parameter for partitioning the first target information from the preset rule, the second configuration parameter at least comprising IDs for identifying different types of information in the first target information, and allocate different IDs for different types of information in the first target information, wherein the different types of information in the first target information at least comprises information obtained in different manners, to split the first target information in accordance with different IDs according to the second configuration parameter, so as to obtain the plurality of items of second target information and overlaying and displaying the plurality of items of second target information on the plurality of pictures respectively; or, combine the second configuration parameter and the first configuration parameter to split the first target information by means of different IDs, and overlay and display the plurality of items of obtained second target information on the plurality of pictures respectively.

11. The terminal according to claim 10, wherein the processor is further configured:

to extract a third configuration parameter for partitioning the first target information from the preset rule, the third configuration parameter at least comprising different first overlaying display mechanisms adopted for different information lengths of the first target information, and/or different second overlaying display mechanisms adopted for different quantities of the plurality of pictures, to combine the third configuration parameter with the first configuration parameter and the second configuration parameter to split the first target information in accordance with different first overlaying display mechanisms and/or second overlaying display mechanisms, and overlay and display the plurality of items of second target information obtained by splitting on the plurality of pictures respectively.

12. The terminal according to claim 7, the processor is further configured to: save, after the plurality of items of second target information are overlaid on the plurality of pictures in one batch, the plurality of pictures, and provide the plurality of pictures for a social application for use, such that the plurality of pictures are displayed in the same display interface of a preview/edit interface of the social application.

13. A non-transitory computer storage medium having computer executable instructions stored therein, wherein the computer executable instructions are configured to execute an information processing method, applied to a terminal, the method comprising:

receiving a first operation;

in response to the first operation, selecting a plurality of pictures from a local information base or an information base pulled and obtained by a background server, and displaying the selected plurality of pictures on a user interface of the terminal;

receiving to-be-added first target information comprises:

receiving first information which is non-text information selected from the local information base or the information base obtained by pulled and obtained by the background server; or, receiving a combination of the first information and second information, wherein the second information is text input by a user in real time;

receiving a second operation;

in response to the second operation, partitioning the to-be-added first target information into a plurality of items of second target information, and overlaying the plurality of items of second target information on the plurality of pictures simultaneously according to a preset rule, wherein the preset rule being configured to represent an arrangement rule and/or attribute of the plurality of pictures and the plurality of items of second target information overlaid on the plurality of pictures; and displaying the plurality of pictures, with the plurality of items of second target information being displayed as multiple partial information split on the plurality of pictures.

* * * * *